United States Patent [19]

Cross

[11] 4,355,471

[45] Oct. 26, 1982

[54] SQUAREANGLE

[75] Inventor: L. Allan Cross, Groveville, N.J.

[73] Assignee: Richard M. McMahon, Baltimore, Md.

[21] Appl. No.: 195,244

[22] Filed: Oct. 8, 1980

[51] Int. Cl.³ .............................................. B43L 13/00
[52] U.S. Cl. ........................................ 33/422; 33/474; 33/476
[58] Field of Search ................................. 33/418–423, 33/424–429, 452, 474, 476

[56] References Cited

U.S. PATENT DOCUMENTS

| | | | |
|---|---|---|---|
| 629,078 | 7/1899 | Holz | 33/474 |
| 864,096 | 8/1907 | Kaempf | 33/427 |
| 3,766,654 | 10/1973 | Canton | 33/429 |

FOREIGN PATENT DOCUMENTS 63990 12/1892 Fed. Rep. of Germany ........ 33/418

*Primary Examiner*—Charles E. Phillips
*Attorney, Agent, or Firm*—Richard M. McMahon

[57] ABSTRACT

This invention relates generally to mobile carpentry and drafting devices and, more particularly, to an integral combination type device which is capable of performing multiple geometry measuring functions within a single instrument. The invention relates specifically to a unique combination of independent carpentry functions into a single device to replace separate tools heretofore required to perform individual functions. The Squareangle may be used to check surfaces for plumb and levelness; check inside and outside squareness; find the center of a circle, square, or octagon; mark 45° and right angles; scribe lines; measure distance; and perform other geometry and drafting functions without the aid of additional devices.

13 Claims, 10 Drawing Figures

U.S. Patent Oct. 26, 1982 Sheet 1 of 2 4,355,471
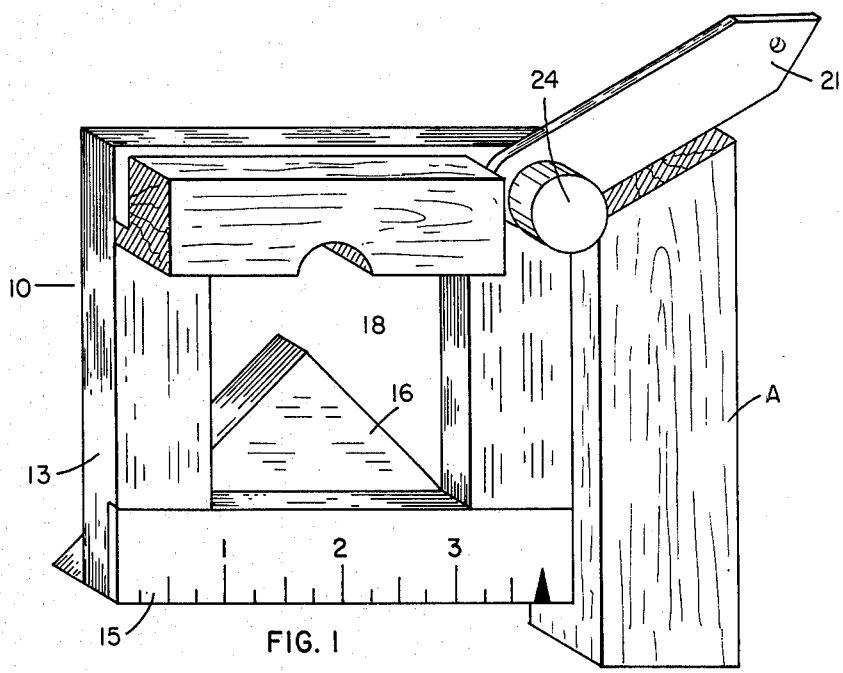
FIG. 1
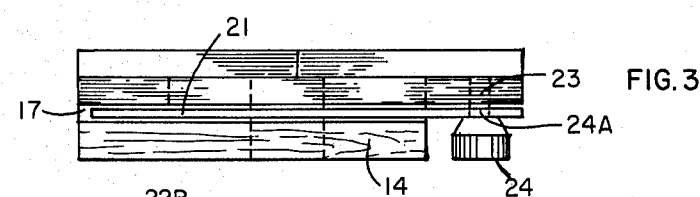
FIG. 3
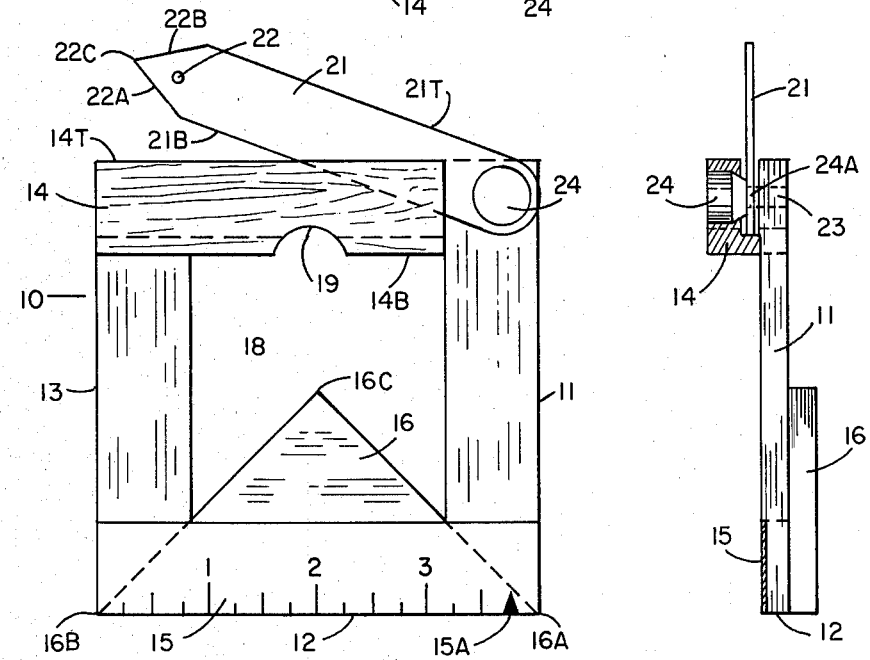
FIG. 2
FIG. 4

SQUAREANGLE

SUMMARY OF INVENTION

This invention relates generally to mobile carpentry and drafting devices, and more particular to an improved combination type of device capable of performing multiple geometry functions with a single tool. Heretofore, individual drafting instruments or carpentry tools were required to perform each function such as marking 45° angles with the use of a conventional 45° triangle, T-square, or protractor. In the field of carpentry and technical drafting straight edges, rulers, protractors, compasses, T-squares, triangles, levels, bevels, and other measuring devices were required as separate elements or in conjunction with each other to measure, mark 45° or 90° angles or check objects for squareness, plumb, or levelness. These functions, by necessity required a number of separate tools, devices, or instruments to achieve the desired result.

Further, the cost of individual devices to perform the geometry functions necessary to professionally construct wood items greatly increases the cost of such work. The number of different individual tools and instruments required to check surfaces for plumb and levelness; checking inside and outside surfaces for squareness; marking 45° and right angles; scribing lines parallel to one edge of an object; finding the center of a dowel, square, octagon, or circle; scribing straight lines; and measuring distance in either English or metric units has been a particular concern to carpenters and draftpersons who must work with both hands and find it difficult to hold unused tools while working with one device at a time. The result is frequently approximations and all kinds of makeshifts with the instruments the user has conveniently at hand.

It is therefore a specific object of the invention to eliminate the necessity of multiple individual tools and devices by providing a singular integral combination type device capable of performing all of the foregoing functions.

Various devices have been proposed heretofore to measure angles and squareness and by inclusion of a spirit level with such a device can also check levelness and plumb of surfaces. However, the relatively high cost of such levels and the ease of breaking the delicate vials thereof, make this a costly solution to a simple practical need of carpentry. One object of the invention is to eliminate the need for a spirit level with a single combination instrument that can be used to check squareness, plumb, and levelness.

Another object is to provide a simple, mobile, integral combination device which can accurately be used to scribe lines parallel to one edge of a flat surface and find the center of a circle or dowel. The present invention provides an improved method of accomplishing these functions as well as being simpler in construction and less costly to manufacture than separate individual tools required heretofore to perform these same functions.

Still a further object of the present invention is to provide a small, compact, sturdy, and easy to handle combination device which can be used for multiple carpentry and drafting functions and which such combination device may be quickly and easily moved from one position to another in wood working or passed from one carpenter to another without loss of alignment or damage to the device.

A further unique feature of the present invention is provided by the capability to easily and accurately secure the compliment of an unknown angle. This function can not be performed by conventional bevels and provides a very useful function in woodworking.

The present invention has an object to provide an inexpensive measuring device capable of measuring distance in either English units or metric units which can be used in combination with measurement and marking 45° and right angles as well as inside and outside squareness.

A primary object of the present invention is to provide a simple, accurate, integral device which is capable of performing a plurality of carpentry and drafting functions without the use of extraneous instruments and tools.

This invention possesses other objects and features of advantage which will become apparent from the following description taken in conjunction with the accompanying drawings.

BRIEF DESCRIPTION OF DRAWINGS

FIG. 1 is a perspective view of the Squareangle constructed in accordance with this invention in use checking the bevel of an unknown angle.

FIG. 2 is a front plan view of the device showing the blade in an elevated position.

FIG. 3 is a top view of the Squareangle device constructed in accordance with this invention.

FIG. 4 is a side view showing the side plan view of the Squareangle device showing the attached triangle.

DETAILED DESCRIPTION

Figure 5:
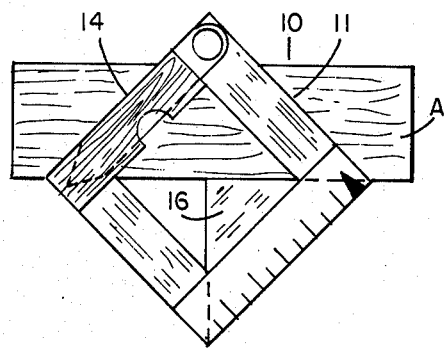
FIGS. 5 through 10 are plan views of the Squareangle device illustrating the various functions which the invention is capable of performing.

Referring to the drawings for a better understanding of the present invention, as shown in FIG. 1, the Squareangle 10 is depicted as checking the bevel of an unknown angle on the edge of a flat object A. The squareangle blade 21 is pivotably attached to the outside perfect square base 13 with lockknob 24. The Squareangle 10 contains within itself a hole 18 which is also a perfect square. Triangle 16 is affixed to the base of the Squareangle, and scale 15 is rigidly attached to the front of the base of the Squareangle 10.

As shown in FIG. 2, Squareangle 10 is formed of a rigid material having opposite sides 11 and 13 parallel to each other and precisely perpendicular to side 12 at the base and rectangular edge 14 at the top of the device with side 12 parallel to rectangular edge 14. A square opening 18 is formed in Squareangle 10 at equal distances from the edges of the outer sides 11, 12, 13, and rectangular straight edge 14.

Triangle 16, formed of rigid material, having two 45 degree angles 16A and 16B at the base and one right angle 16C. The base of triangle 16 is the same length as the base of the Squareangle 10. Triangle 16 is affixed to the rear of base 12 as is shown in FIG. 4.

Slotted rectangular straight edge 14 is located directly opposite but parallel to base 12 of the Squareangle. Rectangular straight edge 14 is slotted as shown in FIG. 3 with slot 17 parallel to the longer side of rectangular straight edge to accommodate blade 21 which is attached to rectangular straight edge 14 by pivot screw 23 and held firmly by lockknob 24. Rectangular straight edge 14 is formed of rigid material and is attached to the Squareangle 10 with edge 14T being parallel to side 12 and tangent to the square outer edge and edge 14B being parallel to side 12 and tangent to the square inner edge. As shown in FIG. 2, rectangular straight edge 14 also has a semi-circular grove 19 removed and which is recessed into slot 17 to allow simple upward access to blade 21 thereby allowing it to be pushed upward from the slot 17 in a circular motion around pivot screw 23.

Blade 21, having two parallel edges 21T and 21B, is slightly less in length than slotted rectangular edge 14. Blade 21 is rotatively attached to Squareangle through pivot hole 24A by pivot screw 23 and held in position by lock knob 24 as shown in FIGS. 3 and 4. Blade 21 is rotatively attached to Squareangle so that blade edges 21T and 21B can be rotatively positioned precisely parallel to rectangular straight edge 14, and blade 21 can be rotated around pivot screw 23 so that blade edges 21T and 21B are positioned precisely parallel to side 11. As shown in FIG. 2, blade 21 comes to a point at 22C formed by the junction of blade edges 22A and 22B at the center line of blade 21. Scribe hole 22 is located on the center line of blade 21 near point 22C. Blade top edge 21T is parallel along its length to blade bottom edge 21B. The pivot end of blade 21 is rounded to a perfect semi-circle with pivot hole 24A positioned in the center of the radius of the circle. Blade 21 can be locked at any angle through its rotation by engaging lockknob 24, and it can be fully retracted within slot 17 of rectangular straight edge 14. Blade 21 is constructed symmetrically and is of sufficient weight to hang vertically as a plumb when not locked in position firmly by lockknob 24.

Referring to FIG. 2, a thin scale 15 is scribed unto or is affixed to the front surface of Squareangle base 12. A legible mark 15A is scribed on scale 15 to indicate a level or plumb condition when point 22C of blade 21 is centered precisely on mark 15A. Scale 15 can be used for measuring distance or scribing lines using a bottom scale for English measuring units and a top scale for metric units.

The functions which can be performed by the Squareangle device are illustrated in FIGS. 5 through 10.

FIG. 5 shows positioning of Squareangle 10 to mark a 45 degree angle on surface A on either the right using side 11 or the left side utilizing rectangular straight edge 14.

Figure 6:
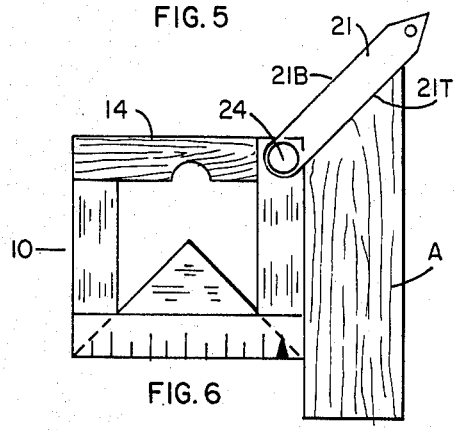

FIGS. 1 and 6 show positioning of Squareangle 10 to record an unknown angle on the edge of object A. Blade 21 is positioned with its top edge 21T parallel and abutting the unknown angle on the edge of the frame A and held in position by lockknob 24. The 90° compliment of the unknown angle, which can not be determined with the use of a conventional bevel, is obtained between bottom edge 21B and rectangular straight edge 14.

Figure 7:
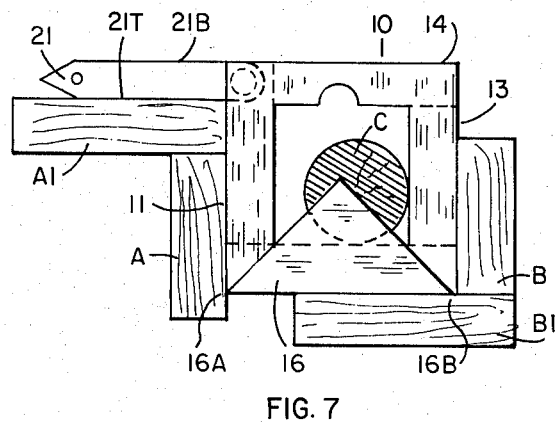

FIG. 7 depicts the positioning of Squareangle 10 to check the inside squareness formed by junction of surfaces B and B-1. Side 13 is placed parallel and abutting to one edge of surface B to be checked. The absence of a gap between the bottom edge of Squareangle side 12 and the top edge of surface B-1 indicates perfect inside squareness of surfaces B and B-1.

FIG. 7 shows positioning of Squareangle 10 to check the outside squareness of the angle formed by the junction of two edges A and A-1. Blade 21 is positioned with edge 21B parallel and continuous to top edge of rectangular straight edge 14. Squareangle side 11 is placed parallel and abutting to outer edge A of the surface to be checked. The absence of a gap between blade edge 21T and outer edge of surface A-1 indicates perfect squareness of the outer angle formed by the junction of A and A-1.

FIG. 7 also depicts the positioning of Squareangle 10 to locating the center of a dowel or circle. Squareangle 10 is positioned with triangle 16 facing front. Dowel C is placed inside the square opening and abutting side 11 and base side 12 (as shown in FIG. 7) or abutting side 13 and base side 12. A line is scribed across dowel C using the adjoining edge of triangle 16. Dowel C is rotated to any extent and must remain abutting the inside sides of the squareangle; a second line is scribed across dowel C. The intersection of the two scribed lines on dowel C is the center point. The device can also be used to locate the center of a square of octagon in a similar manner (not shown).

Figure 8:
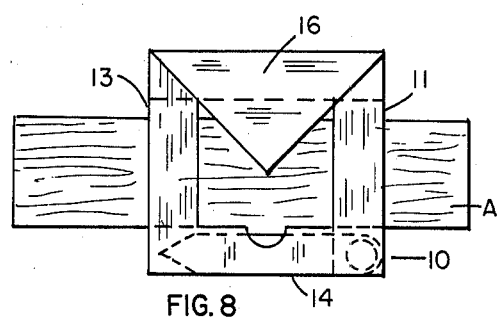

FIG. 8 shows positioning of Squareangle 10 to mark a 90 degree angle on surface A with triangle 16 facing front. Rectangular straight edge 14 is positioned abutting one edge of surface A with the edge abutting the flat surface of sides 11 and 13. A 90 degree reference angle may be scribed on surface A using either the outside or inside edge of side 13 on the right or side 11 on the left of Squareangle 10.

Figure 9:
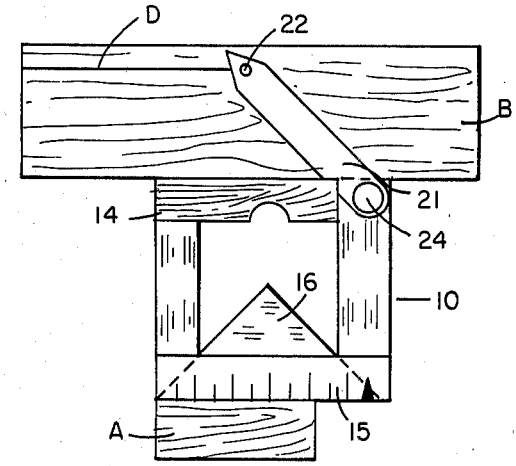

FIG. 9 indicates the positioning of Squareangle 10 for marking a line parallel to one edge of flat object B. Rectangular straight edge 14 is positioned abutting the bottom edge of the flat surface to be marked. Blade 21 is positioned at height where parallel line D is required and locked firmly in position by lockknob 24. A line D parallel to the bottom edge of object B can be marked or scribed using a pencil or scribe in hole 22 and moving Squareangle 10 along the surface of surface B while rectangular straight edge 14 continues to abut along the bottom edge of object B.

FIG. 9 also depicts positioning of Squareangle 10 to mark off a distance using scale 15 which can be marked with both English and metric measuring units.

Figure 10:
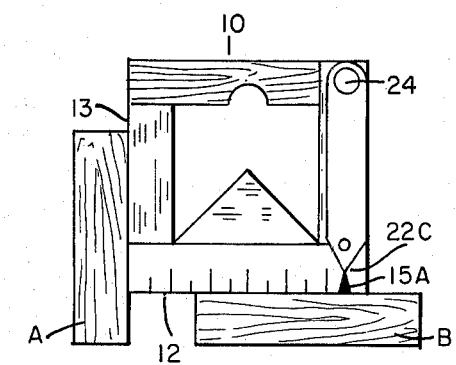

FIG. 10 shows positioning of Squareangle 10 to check plumb with reference to surface A. Outside edge 13 is positioned firmly abutting surface A. Lockknob 24 is loosened to permit blade 21 to move freely. Blade point 22C will be centered precisely with mark 15A if surface A is plumb with reference to Squareangle 10.

FIG. 10 also indicates positioning of Squareangle 10 to check for levelness of surface B. Bottom edge of base side 12 is positioned firmly abutting the top edge of surface B. Lockknob 24 is loosened to permit blade 21 to move freely. Blade point 22C will be centered precisely with mark 15A if surface B is level with base side 12 of squareangle 10.

Because other variations, sizes, changes, and modifications may be made to the embodiments described, it is intended that all matter in the foregoing description be interpreted as illustrative and not as limitations of my invention or the scope of the appended claims.

What I claim as new and desire to secure by Letters of Patent of the United States is:

1. An integral, mobile combination drafting and carpentry device comprising:
   a rigid square body bounded by four sides and having a front and back surface and having a square opening through said surfaces located precisely at the center of the said body;
   a rigid triangle having forty-five degree angles at its base with the length of the triangle base being the same as one side of said body and secured to the back surface of said body with the triangle base parallel to and coextensive with the edge of said one side of said body;

a measuring scale on the front surface of said body and located near said one side and including a levelness reference mark located near another side which intersects said one side;

a rigid movable blade having a pointed end and being rotatably attached to said body front surface at the junction of said other side with a side that is parallel to said one side and said pointed end cooperating with said reference point;

a means of firmly holding said blade at any angle through its rotation.

2. A combination drafting and carpentry device as claimed in claim 1, wherein the measuring scale is scribed with English units of measure on one surface and metric units of measure on the opposite surface.

3. A combination drafting and carpentry device as claimed in claim 1, wherein the body is constructed of rigid durable transparent plastic material.

4. A combination drafting and carpentry device as claimed in claim 1, wherein the body is constructed of rigid durable translucent plastic material.

5. In an integral, mobile combination carpentry device comprising:

a rigid square body bounded by four sides and having a front and back surface and having a square opening through said surfaces located precisely at the center of the said body, and said body having a top slotted edge offset in a plane to the vertical plane of the said body and having a recessed grove removed at the bottom of the slotted edge;

a rigid movable blade having a pointed end and being rotatably attached to said body front surface at the junction of said top slotted edge with a vertical edge of said body so that said rotatable blade may be retracted within the slot of said top edge and rotatatively positioned parallel to the top slotted edge and rotively positioned parallel to the said vertical edge of the said body;

a rigid triangle having two forty-five degree angles at its base with the length of the triangle base being equal to the outside length of said body and secured to the back surface of said body with the triangle base parallel to and coextensive with one side of said body;

a measuring scale located on the front surface of said body near said one side and including a levelness reference mark located near another side which intersects with said one side, said blade cooperating with said reference mark;

a means of firmly holding the said blade at any angle through its rotation.

6. A combination drafting and carpentry device as claimed in claim 5 wherein the rotatable blade is constructed of metal of sufficient weight so as to hang perfectly vertical when not held in position by said holding means and the blade has a scribe hole located on the center line near the tip of the triangular point.

7. A combination drafting and carpentry device as claimed in claim 5, wherein the measuring scale is marked with English units of measure on one surface and metric units of measure on the opposite surface.

8. A combination drafting and carpentry device as claimed in claim 5, wherein the body is constructed of rigid but durable transparent plastic material and said triangle is constructed of rigid but durable translucent plastic material.

9. A combination drafting and carpentry device as claimed in claim 5, wherein the rotable blade is constructed of plastic of sufficient weight so as to hang perfectly vertical when not held in position by said holding means and the blade has a scribe hole located on the center line near the tip of the triangular point.

10. An integral, mobile combination carpentry device comprising:

a rigid square body bounded by four sides and having a front and back surface and having a slotted top edge offset to the vertical plane of the said body with a semi-circular grove removed at the bottom of the top slotted edge with the said body having a square opening through said surfaces located precisely at the center of the said body;

a rigid forty-five degree triangle with a right angle at the top of said triangle and base length equal to the base of the said body and attached to the back surface of the said body with the triangle base parallel to and coextensive with the edge of the said body;

a metal rotatably movable rectangular blade having a pointed end and a semi-circular shape at the opposite end, and said blade pivotedly joined to said body at the junction of one vertical edge of said body with the said slotted top edge and, said blade having a small hole in the center of the said blade near the point;

a measuring scale attached to the front surface of of said body including a levelness reference mark located near said one side;

a means of firmly holding the said blade at any angle through its rotation.

11. A combination carpentry device as claimed in claim 10, wherein the measuring scale is marked with English units of measurement on one surface and metric units of measure on the opposite surface.

12. A combination carpentry device as claimed in claim 10, wherein the body is constructed of rigid durable plastic material; said rectangular slotted top edge is constructed of rigid durable plastic material.

13. A combination carpentry device as claimed in claim 10, wherein the body, rectangular slotted top edge, and triangle are constructed of rigid durable plastic material.

* * * * *